United States Patent Office 3,262,195
Patented July 26, 1966

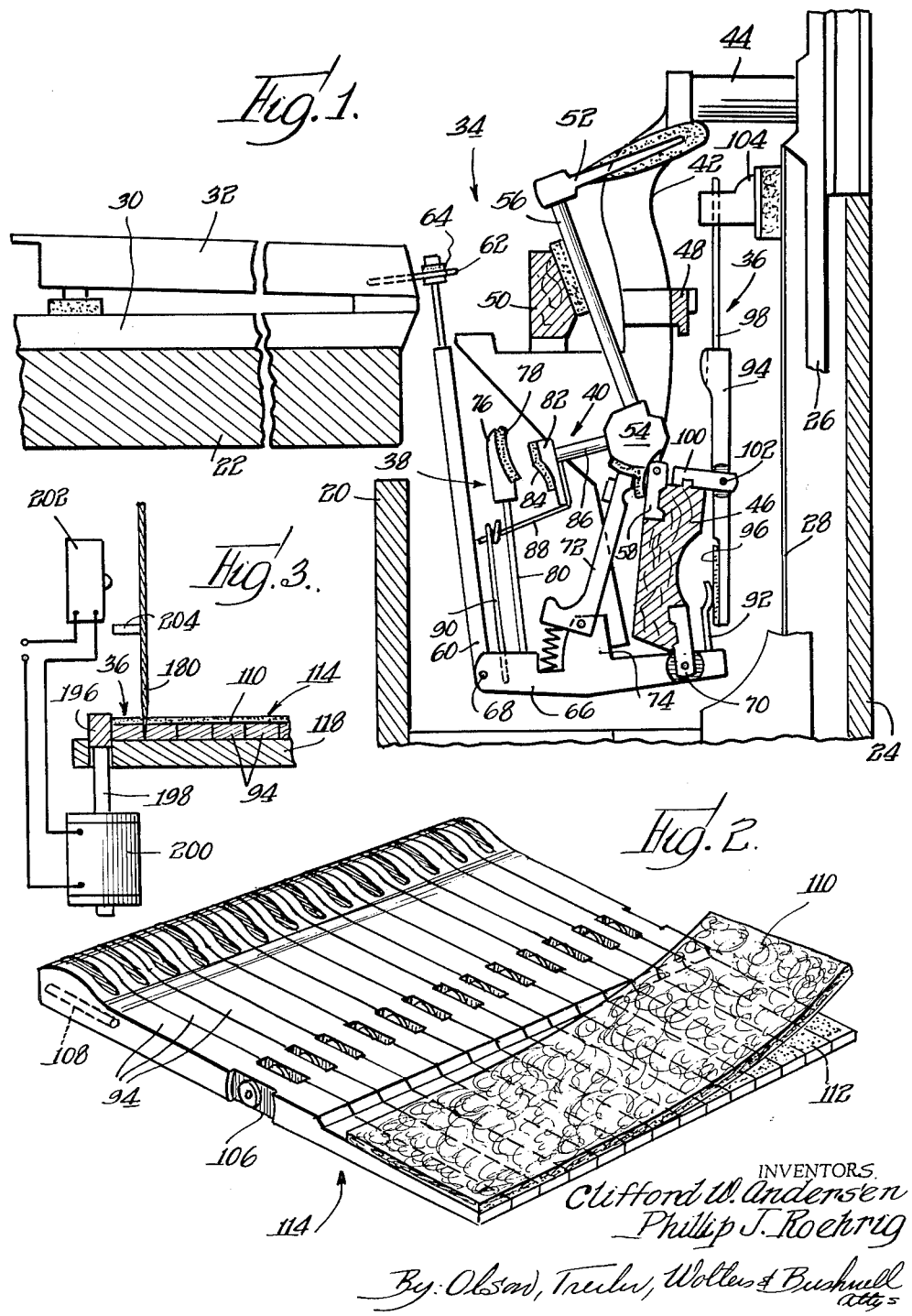

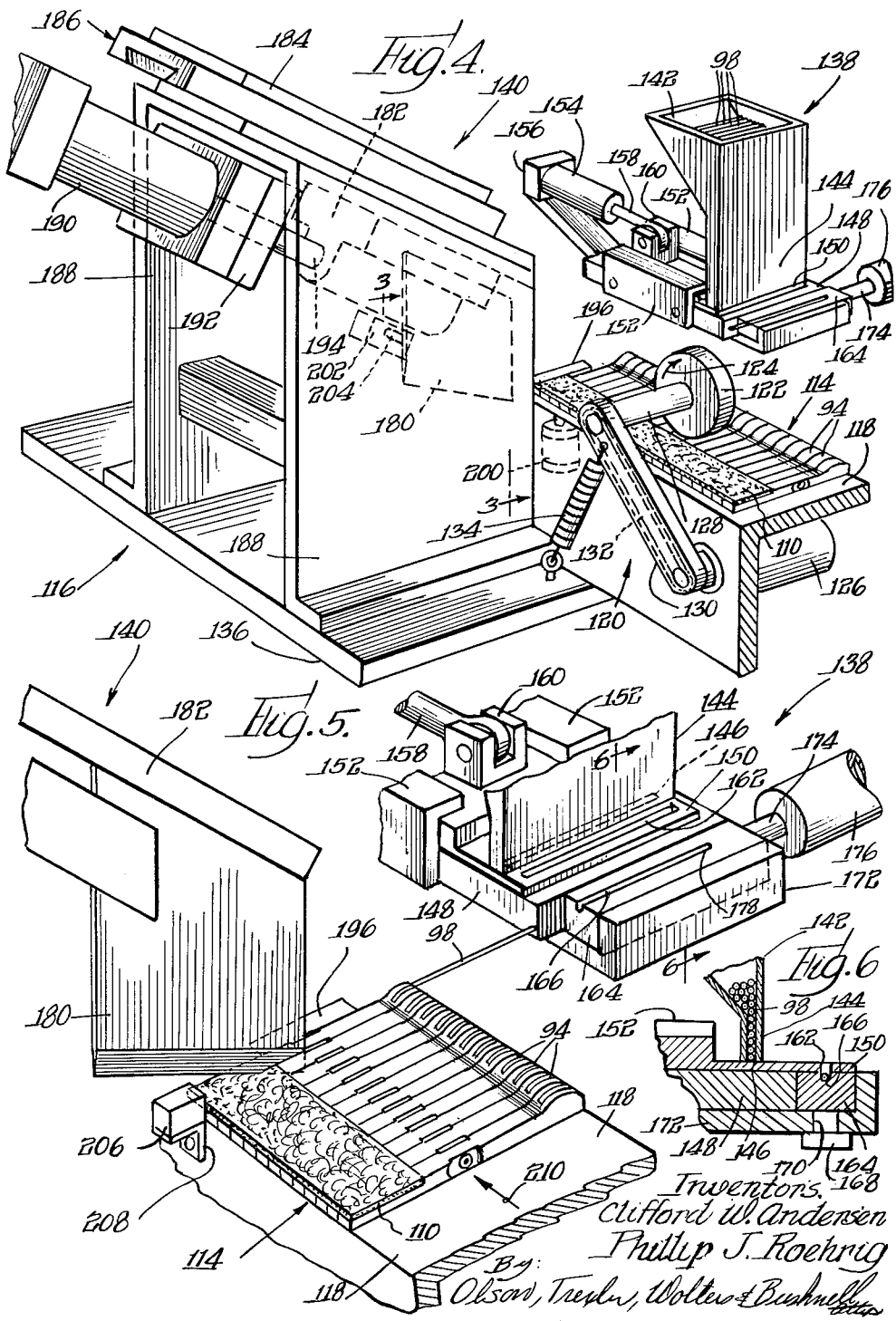

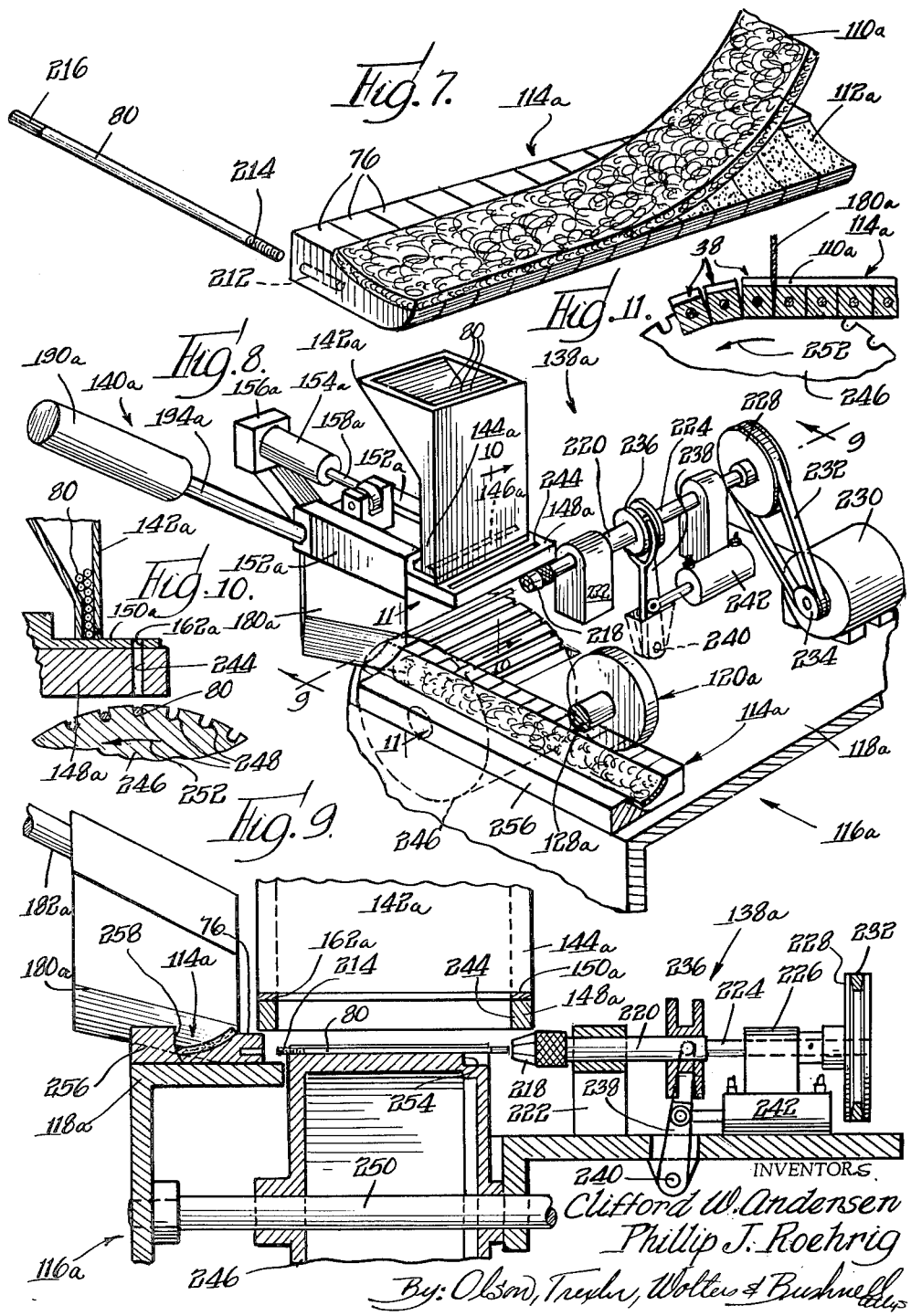

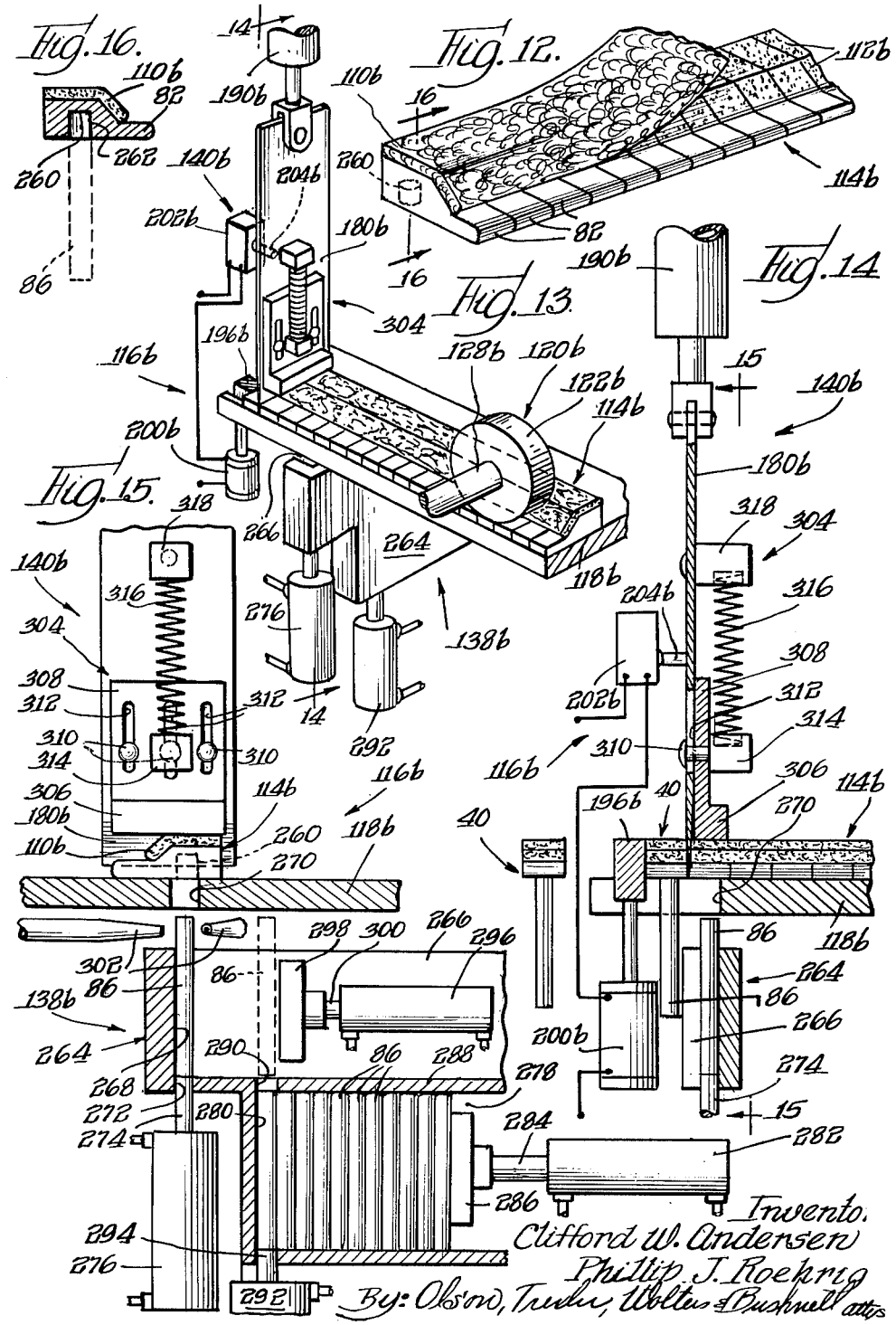

3,262,195
METHOD OF MAKING DAMPER LEVER ASSEMBLIES, CATCHER ASSEMBLIES AND LIKE PARTS FOR PIANO ACTIONS
Clifford W. Andersen, De Kalb, and Phillip J. Roehrig, Rockford, Ill., assignors to The Wurlitzer Company, Chicago, Ill., a corporation of Ohio
Original application Sept. 13, 1963, Ser. No. 308,828. Divided and this application Apr. 12, 1965, Ser. No. 447,472
6 Claims. (Cl. 29—411)

This application is a division of our copending application, Serial No. 308,828, filed September 13, 1963.

This invention relates generally to the manufacture of pianos and analogous musical instruments, relating more particularly to the manufacture of damper lever assemblies and like parts for use in a piano action mechanism.

Various parts or subassemblies of a piano action mechanism comprise a resilient pad, usually made of felt, an irregularly shaped wooden body and a wire or wooden dowel rod. Among the parts of this character are the damper lever assembly, the catcher assembly and the backcheck assembly. In the past, these parts have been made by first gluing the pad to the wooden body, then trimming the felt and finally driving the wire or dowel rod into a pilot hole fashioned in the wooden body. This procedure has necessitated much handling of the parts and has required manual positioning of the wooden body in separate machines for trimming and for assembly of the wire or rod. Moreover, proper positioning of the wooden body to receive the wire or rod has proved to be a problem; and unduly high numbers of the finished assemblies have been graded as rejects because of splitting and because of misaligned wires. As a result, the prior art procedure has been relatively costly to practice.

Therefore, an important object of the present invention is to provide a method of making damper lever assemblies and like parts in an economical manner.

Another object of the invention is to provide a method of making damper lever assemblies and like parts with a minimum of handling.

A more general object of the invention is to provide a new and improved method of making damper lever assemblies and like parts.

A further object of the invention is to provide a method of making damper lever assemblies and like parts wherein the wooden parts body is accurately positioned for receipt of a parts rod.

These and other objects and features of the invention will become more apparent from a consideration of the following disclosure.

Damper lever assemblies and like parts are manufactured in compliance with the invention by first securing a strip of material such as felt to a number of aligned wooden parts bodies thereby interconnecting the parts bodies and forming an articulated workpiece. This workpiece is appropriately supported for engagement by an impositive drive whereby continuously to urge the workpiece along a predetermined path. Furthermore, the workpiece is selectively stopped in its transit along this path for assembling a rod member to one of the parts bodies and for severing the felt strip adjacent a parts body having a rod member assembled thereto, thus separating the completed assembly from the workpiece. Thereafter, the workpiece is released to the action of the impositive drive momentarily to advance the workpiece, advance of the workpiece acting to eject the separated and completed assembly from the work path.

In order that the principles of the invention may be readily undersood, three embodiments thereof applied respectively to the manufacture of damper lever assemblies, backcheck assemblies and catcher assemblies, but to which the application is not to be restricted, are shown in the accompanying drawings wherein:

FIG. 1 is a central sectional view taken through a piano structure to show the operating elements thereof, including a damper lever assembly, backcheck assembly and a catcher assembly constructed in compliance with the invention;

FIG. 2 is a perspective view of a plurality of damper lever parts bodies disposed in lateral alignment and illustrated as being in the process of becoming adhesively secured to a felt strip for interconnection into an articulated workpiece;

FIG. 3 is a fragmentary elevational view of manufacturing apparatus constructed according to the invention, showing cutting of the felt strip to separate a completed damper lever assembly from the articulated workpiece, FIG. 3 being an enlarged view taken along the line 3—3 of FIG. 4;

FIG. 4 is reduced scale view of the apparatus incorporating the arrangement of FIG. 3;

FIG. 5 is an enlarged perspective view of the apparatus of FIG. 4, showing in particular the arrangements for assembling the wire or rod to the wooden parts body and the cutter arrangement for severing the felt strip;

FIG. 6 is a somewhat enlarged elevational view taken substantially along the line 6—6 of FIG. 5;

FIG. 7 is a perspective view of a plurality of aligned backcheck parts bodies shown in the process of being assembled to an elongated felt strip to develop an articulated workpiece, FIG. 7 additionally illustrating a backcheck wire which is to be assembled to one of the backcheck parts bodies;

FIG. 8 is a perspective view of apparatus for assembling the backcheck wire to one of the backcheck parts bodies and for severing the felt strip to separate the completed assembly from the articulated workpiece;

FIG. 9 is an enlarged elevational view taken substantially through the section 9—9 of FIG. 8;

FIG. 10 is an enlarged elevational view taken substantially through the section 10—10 of FIG. 8;

FIG. 11 is an enlarged elevational view taken substantially through the section 11—11 of FIG. 8;

FIG. 12 is a perspective view of a plurality of catcher parts bodies which are aligned to have a felt strip attached thereto in developing an articulated workpiece;

FIG. 13 is a perspective view of apparatus to be used in assembling a catcher shank to each of the catcher parts bodies in the articulated workpiece of FIG. 12;

FIG. 14 is an enlarged elevational ivew taken substantially along the line 14—14 of FIG. 13;

FIG. 15 is a side elevational view taken along the line 15—15 of FIG. 14; and

FIG. 16 is a side elevational view of the workpiece of FIG. 12, taken along the line 16—16 of FIG. 12, and indicating assembly of a catcher shank to a catcher parts body.

Referring now in detail to the drawings, specifically to FIG. 1, a piano structure is shown to include a front panel 20, a keybed 22 and a string frame 24. In accordance with conventional practice, an upper frame member 26 is affixed to the frame 24 for supporting a customary number of piano strings such as piano string 28. In further accord with conventional practice, a balance rail, not shown, is mounted on a plate 30 which is fastened to the keybed 22, the balance rail acting to support and fulcrum a number of piano key levers such as piano key lever 32.

Depression of the forward end of piano key lever 32 is arranged to cause a striking of the corresponding piano string 28 through a piano action mechanism indicated generally by the numeral 34. The action mechanism 34 includes a damper lever assembly 36, a backcheck assembly 38 and a catcher assembly 40, each of these assemblies comprising a resilient pad, an irregularly shaped wooden body and a wire or wooden dowel rod as will be described more fully hereinafter. The action mechanism 34 is mounted in the piano structure by means of a number of action brackets 42, and each of the action brackets 42 is fastened to the plate 26 by means including a tubular action spacer 44. A main rail 46, a spring rail 48 and a hammer rail 50 extend through the piano structure to be affixed to each of the action brackets 44 for purposes of supporting the individual action components.

The action mechanism 34 incorporates a hammer 52 which is mounted to a butt knuckle 54 by a hammer shank 56, the butt knuckle 54 being pivotally mounted to the main rail 46 by means of a butt flange 58. Depression of the piano key lever 32 is arranged to actuate hammer 52 by means of a sticker or abstract 60. The sticker 60 is detachably affixed at one end to the key lever 32 by means of a keyfork 62 and a rubber grommet 64, the sticker 60 being swingably mounted at its other end to a whip 66 by means of a pivot pin 68. The whip 66 is pivotally mounted to the main rail 46 by means of a whip flange 70; and a fly or jack 72 is pivotally mounted to and spaced apart from whip 66 by means of an integral fly flange 74, depression of piano key lever 32 causing actuation of hammer 52 by transmitting force thereto through contact of the fly or jack 72 with the butt knuckle 54.

The backcheck assembly 38 includes an irregularly shaped wooden parts body 76, a felt pad 78 which is adhesively secured to the parts body 76 and an elongated wire or parts rod 80 that penetratingly engages the parts body 76. The backcheck parts body 76 is mounted on the whip 66 in upstanding relationship by means of the wire 80 being driven into the whip in approximately right-angled relationship. The catcher assembly 40 is intended to coact with the backcheck assembly 38 in operation of the action mechanism 34; and the catcher assembly 40 includes an irregularly shaped wooden parts body 82, a felt pad 84 which is adhesively secured to the parts body 82 and a wooden catcher rod or shank 86 which is mounted to the parts body by being adhesively fastened in on appropriately shaped bore formed in the parts body. The catcher shank 86 is mounted to the butt knuckle 54 in radial relationship in order to dispose the felt-surfaced catcher parts body 82 in cooperative relationship with the felt-surfaced backcheck parts body 76.

A flexible connection is provided between the butt knuckle 54 and the whip 66 by means of a bridle strap 88 and a bridle wire 90. The bridle wire 90 is driven into the whip 66 at approximately right angles and receives one end of the bridle strap 88 in coupled relationship. The opposite end of the bridle strap 88 is wedged with the end of the catcher shank 86 into an appropriately shaped bore formed in the catcher parts body 82.

The action mechanism 34 also includes a metal spoon 92 which is affixed to the whip 66 in upstanding relationship, being disposed on the end of the whip which is opposite its connection with the abstract 60. Upon actuation of the whip 66 by means of the key lever 32, the spoon 92 contacts one end of the damper lever assembly 36. The damper lever assembly itself includes an elongated, irregularly shaped wooden parts body 94, a felt pad 96 which is adhesively secured to one end of the parts body 94 to be contacted by the spoon 92 and a damper lever wire or rod 98 that is piercingly coupled with the parts body 94 in generally longitudinal relationship therewith. The damper lever assembly 36 is swingably mounted to the mail rail 46 by means of a damper lever flange 100 and a pivot pin 102. The spoon 92 is specifically arranged to operate the damper lever assembly 36 so as to retract a damper head 104 from contact with the piano string 28 immediately in advance of the hammer 52 striking the string.

Manufacture of damper lewer assemblies will now be described with reference to FIGS. 2–6; and after the the wooden parts bodies 94 have been formed and shaped, a suitable number of these parts bodies are laterally aligned in compliance with the showing of FIG. 2. As is well known, each of the damper lever parts bodies 94 includes a narrow central section 106 which is to be disposed between the arms of a damper lever flange 100, being additionally fashioned with a generally longitudinally extending bore or pilot hole 108 for receiving one end of a damper lever wire 98. In accordance with the invention, an elongated strip 110 of flexible resilient material is secured to the aligned damper lever parts bodies 94; and the strip 110 is specifically fabricated from the material which is to surface the damper lever parts body at its point of contact with the spoon 92. Ordinarily, the strip 110 is made of felt. In order to establish individual attachment sites between each of the parts bodies 94 and the strip 110, adhesive material 112 is coated over appropriate areas of the parts bodies, and the strip 110 is pressed against these adhesively coated areas until the adhesive material has set and cured. This attachment of the strip 110 to the aligned parts bodies 94 interconnects the parts bodies so as to form an articulated workpiece 114.

The articulated workpiece 114 is intended to be processed by apparatus indicated generally in FIG. 4 by the numeral 116 whereby to produce a quantity of the damper lever assemblies 36. The apparatus 116 includes a table 118 for receiving and supporting the workpiece 114 in its transit along a work path, the table 118 specifically supporting the workpiece 114 for movement longitudinally thereof. The apparatus 116 also includes a workpiece drive arrangement 120 for advancing the workpiece 114 over the table 118 and along the work path. As is shown in FIG. 4, the drive arrangement 120 includes a drive disk 122 which is continuously rotated in the direction of arrow 124 by means including a suitably energized motor 126. The drive disk 122 is rigidly mounted on a shaft 128, shaft 128 being journalled in a link 130. The link 130, in turn, is journalled on the output shaft of motor 126; and driving connection is completed between the output shaft of motor 126 and the shaft 128 by an endless drive belt 132 or other suitable means. The drive disk 122 is biased into engagement with the workpiece 114 by means of a tension spring 134 that is connected between link 130 and a platform 136. In compliance with a feature of the invention, the drive disk 122 impositively engages the workpiece 114; and this impositive engagement is developed by providing a relatively smooth peripheral surface on the disk or, alternatively, by arranging the drive belt 132 to slip whenever there is appreciable resistance to the rotation of the disk 122. Thus, the disk 122 may be operated to urge the workpiece 114 continuously along the predetermined path; and as will be recognized, the workpiece 114 may be selectively stopped against the impositive action of the drive arrangement 120, accordingly developing a stepping or selectively advancing action in the workpiece. Advantageously, the drive disk 122 engages the workpiece 114 at the aligned parts bodies 94 in order to avoid gouging or other deleterious effects on the strip 110 of flexible resilient material.

In addition to the workpiece drive arrangement 120, the apparatus 116 includes a rod assembly arrangement 138 and a cutter arrangement 140, both of which are disposed laterally of the table 118. In the apparatus 116, the rod assembly arrangement 138 includes a supply hopper 142 which is adapted to receive a quantity of the damper lever wires 98 with their axes disposed in parallel relationship. Continuing with reference to FIG. 4 and with secondary reference to FIGS. 5 and 6, the hopper 142 will be seen to include a lower delivery portion 144 which is sized to pass damper lever wires 98 in single file to a discharge opening 146, opening 146 being sized to pass a single parts rod therefrom. The rod assembly arrangement 138 also includes a stationary base plate 148 that is situated beneath the discharge opening 146 of supply hopper 142. Furthermore, a slide plate 150 is interposed between base plate 148 and the discharge end of hopper 142 for extracting a damper lever rod 98 from the opening 146 and delivering it to a positioning member which acts to hold the parts rod in alignment with one of the parts bodies 94 in workpiece 114. The slide plate 150 is reciprocated in a path generally parallel to the path of movement of the workpiece 114; and lateral guides 152 are fastened to the base plate 148 to direct these movements of the slide plate 150. A fluid-actuated jack 154 is mounted to the base plate 148 by means of a bracket 156, and the jack 154 includes an extensible and retractable piston rod 158 that is secured to the slide plate 150 by a coupling 160.

As is best shown in FIG. 5, the slide plate 150 is fashioned with an elongated slot 162 which is fashioned with a length and shape similar to that of discharge opening 146. Correspondingly, the slide plate 150 takes a thickness which is greater than the diameter of a damper lever parts rod 98 so that the slide plate may receive and carry one of the parts rods within its margins. In addition, a transversely reciprocable member 164 is aligned with the base plate 148 beneath the slide plate 150 at its position of extreme extension from the hopper 142. The member 164 is provided with an elongated notch 166 opening both from its upper surface and from the end thereof which confronts the table 118. Thus, the member 164 may receive a damper lever parts rod 98 from the slide plate 150, positioning the parts rod in alignment with one of the parts bodies 94 of workpiece 114 as is well illsutrated in FIG. 4. Referring to FIG. 6, the member 164 is directed in its reciprocating movements by means of an inverted T-shaped tongue 168 which is fastened to the underside of member 164 and which rides in a transverse slot 170, slot 170 being fashioned in a bracket 172 that also supports the base plate 148. Returning to FIGS. 4 and 5, the member 164 is mounted on the end of an extensible and retractable piston rod 174 which comprises an operating element of a fluid-actuated jack 176.

While the floor and sides of the notch 166 act as rod positioning means for receiving a damper lever parts rod and holding the same in alignment with one of the parts bodies 94, the notch 166 includes a wall 178 at its closed end; and the wall 178 serves as a driver element for aggressively contacting the end of a parts rod 98 whereby to drive such a contacted parts rod into assembled relationship with the aligned parts body upon extension of the piston rod 174 from the jack 176.

The cutter arrangement 140 includes a reciprocable cutter blade 180 which is aligned transversely of the table 118 for severing the strip 110 that articulately interconnects the parts bodies 94 in workpiece 114; and in compliance with a method aspect of the invention, this severing of the strip 110 is arranged to be the last step in the manufacture of one of the parts assemblies. By arranging the cutting step to be the final one in the manufacturing procedure, it is possible to utilize the flexible strip 110 throughout the production of the assembly, strip 110 acting to hold the parts bodies 94 together and in controlled positional relationship. It is of considerable advantage to interconnect the parts bodies in this manner until they have been fed into manufacturing apparatus, but it is of greater advantage to interconnect the parts bodies until the manufacturing has been completed except for severing of the strip.

With reference to FIG. 4, the cutter blade 180 is mounted to a carrier 182. In order to direct the cutter blade 180 in an inclined cutting path for slicing into the strip 110 rather than chopping the same, the carrier 182 is slidably mounted to an inclined plate 184 in depending relationship therefrom by means of a dovetail slide arrangement 186. The plate 184 and the dovetail slide arrangement 186 are supported on horizontally spaced vertical plates 188, plates 188 being mounted, in turn, on the platform 136. Operating force is transmitted to the cutter blade 180 from a fluid-actuated jack 190 which is secured to the dovetail slide 186 by means of a bracket 192, the jack 190 including an extensible and retractable piston rod 194 that is affixed to the carrier 182.

Considering FIG. 3 together with FIG. 4, a stop member 196 is disposed obstructingly in the path of movement of workpiece 114 along the table 118. More specifically, the stop member 196 is situated at the discharge edge or end of the table 118 to arrest the motion of the workpiece, whereby to permit the functioning of rod assembly arrangement 138 and cutter arrangement 140. With the motion of the workpiece 114 halted, the assembly of a parts rod and the severing of the felt strip is considerably facilitated. The stop member 196 is mounted on an outwardly biased armature 198 of a solenoid 200, solenoid 200 being suitably energized and controlled to withdraw the stop member 196 from obstructing relationship in the workpath whereby to release the workpiece selectively to the advancing action of the drive arrangement 120. The solenoid 200 positions the stop member 196 normally in obstructing relationship relative to the path of movement of workpiece 114; and in order to retract the stop member 196 selectively, the solenoid 200 is connected to a microswitch 202, switch 202 being situated for actuation by a switch operator 204 that is carried by the cutter blade 180. Switch 202 is of a type which is unresponsive to the downstroke of operator 204 but which is actuated to energize the solenoid 200 on the upstroke of the operator. Furthermore, the switch 202 is of a type which, when actuated, serves to energize its associated circuit for a selected time period whereupon to open that circuit thereafter; and as is well known in the switch art, such may be achieved by arranging any one of numerous time delay devices with the switch contacts. Thus, when the switch 202 is actuated by the operator 204, the solenoid 200 is energized to retract the stop member 196 momentarily whereupon subsequent de-energization of the solenoid 200 serves to restore the stop member 196 to its position obstructing the path of movement of the workpiece 114.

Returning to a consideration of FIG. 5, it has proved advantageous to support a parts body 94 laterally against the force of an entering parts rod 98; and therefore, a stationary backup member 206 is fastened laterally of the table 118 by means of a bracket 208. The stationary backup member 206 is specifically situated laterally opposite the member 164 and in confronting relationship therewith in order to provide proper support for the parts body into which a parts rod is being driven by the operation of the member 164. If desired, the stationary backup member 206 may be replaced by a spring-loaded foot which is pressed down onto the workpiece 114 by the cutter blade 180 when the latter element is forcibly lowered into incising relationship with the strip 110.

Having thus described the construction of one embodiment of the apparatus of the invention, it is important now to state how that embodiment operates. Considering FIGS. 4 and 5 and assuming that a workpiece 114 has been situated on the table 118, it is to be recognized that the drive arrangement 120, including the drive disk 122, will act continuously to urge the workpiece toward the stop member 196, that is, along a work path indicated generally in FIG. 5 by an arrow 210. The impositive character of the drive arrangement 120 allows it to continue functioning during the time when the stop member 196 is arresting movement of the workpiece 114.

In order to assemble a parts rod 98 to an awaiting parts body 94, the jack 154 will be actuated to extend the piston rod 158 therefrom whereby to transport the slide plate 150 from beneath hopper 142 to its terminal position overlying the notch 166 in member 164. This action extracts a parts rod 98 from the lower, delivery section 144 of the hopper and deposits the same in the member 164. Thereafter, the jack 154 will be actuated to retract the slide plate 150, and the jack 176 will thereupon be actuated to extend the piston rod 174 therefrom whereby to drive the member 164 toward the workpiece 114 for assembling a parts rod 98 with a parts body 94 at the pilot bore fashioned therein. The stationary stop 206 acts to support the parts body 94 against the force of the entering parts rod 98.

Next, the jack 190 will be actuated to drive the cutter blade 180 in a downward direction for incising the strip 110; and the cutter blade 180 may act to sever the strip 110 so as to separate the parts body which has just received a parts rod or the cuter blade 180 may act to sever the strip 110 so as to separate a parts body which has received its parts rod prior to the parts body which has just received a parts rod from the action of the member 164. As is shown in FIG. 5, the cutter blade 180 is acting to sever the strip 110 at a parts body which has immediately previously received a parts rod. In any event, the cutter blade 180 acts to separate the completed damper lever assembly from the workpiece 114; and after the jack 190 has been actuated to retract the cutter blade 180, the upward stroke of the blade causes the switch operator 204 to engage the microswitch 202 whereby to energize solenoid 200 for momentarily retracting the stop member 196. When the stop member 196 is withdrawn from its obstructing position in the work path that is indicated by arrow 210, the workpiece may advance along such work path under the influence of drive arrangement 120. Upon the termination of the decay period of microswitch 202, the solenoid 200 is de-energized to release stop 196 to the mechanical bias provided in the solenoid whereby to reposition the stop member in obstructing relationship relative to the work path 210. Thus, the workpiece 114 is arrested for subsequent assembly of a parts rod and severing of the strip 110. This procedure will be repeated so long as production of the damper lever assemblies is required; and it is to be observed that separate workpieces 114 may be fed one after the other onto the table 118 in a continuous input due to the fact that the drive arrangement 120 is caused to act on the upper surface of the workpieces. Only minimal manual direction of a newly inserted workpiece is required until the drive disk 122 engages that workpiece. It will also be recognized that the advancing action of the workpiece 114 serves to eject a completed parts assembly from the table 118 over the discharge edge thereof and into a waiting bin, not shown, provided for that purpose.

While a particular embodiment of the invention has been thus far shown and described, it should be understood, of course, that the invention is not strictly limited thereto since many modifications may be made. Therefore, and in order to enhance the understanding of the invention, additional embodiments of the invention are shown in FIGS. 7-16. The making of backcheck assemblies is illustrated in FIGS. 7-11 inclusive, and the making of catcher assemblies is illustrated in FIGS. 12-16 inclusive. Since these latter two embodiments incorporate certain elements which are similar to those found in the embodiment of FIGS. 2-6, like numerals have been used to designate like parts with the suffix letter "a" being employed to distinguish those elements associated with the embodiment of FIGS. 7-11 and with the suffix letter "b" being utilized to indicate those elements associated with the embodiment of FIGS. 12-16.

Considering FIG. 7, a group of the backcheck parts bodies 76 are seen to be aligned for receipt of an adhesive layer 112a whereby to be interconnected by a strip 110a of flexible resilient material, thus developing an articulated workpiece 114a. Moreover, each of the backcheck parts bodies 76 is fashioned with a smooth-walled pilot bore 212 to receive an end portion of a backcheck wire or rod 80. The backcheck wire 80 includes a threaded end portion 214 which is adapted to be turned into the pilot bore 212, the backcheck wire 80 being additionally provided with a longitudinally knurled or ridged end portion 216 which is adapted to be driven into the whip 66 as is shown in FIG. 1. Because it is desirable to turn the backcheck rod 80 into the smooth-walled bore 212, rather than driving it in in straight line fashion, the rod assembly arrangement 138a is arranged to incorporate a driver element which is both reciprocable and rotatable.

Considering FIGS. 8 and 9, the rod assembly arrangement 138a is seen to include a driver element 218 that is fixed on a horizontal sleeve 220, sleeve 220 being journalled in a bearing block 222. In order to provide rotative force to the driver element 218, the sleeve 220 slidably receives a shaft 224 with a splined fit therebetween. Shaft 224 is journalled in a bearing block 226 and has a pulley 228 attached to its rear end. Rotative force is delivered to the pulley 228 from a motor 230 by means of an endless drive belt 232 and a pulley 234 which is fixed on the output shaft of motor 230. In order to provide reciprocable action to the driver element 218, a spool 236 is keyed to the sleeve 220 and a drive fork 238 is pivoted about a pin 240 with its bifurcated end engaging the reduced diameter midsection of spool 236. The extensible and retractable piston rod of a fluid-actuated jack 242 is swingably mounted to the drive fork 238 intermediate its ends for purposes of imparting reciprocating movement to the driver element 218.

The rod assembly arrangement 138a is also embodied with rod positioning means which are particularly appropriate to rotatable entry of the parts rod 80 into a parts body 76 as well as advance of the parts rod along its work path after it has been assembled to the parts body. Continuing with reference to FIGS. 8 and 9 and with additional reference to FIG. 10, the stationary base plate 148a is seen to be fashioned with a slot 244 that is aligned over a rod positioning drum 246. The slot 244 is sized to pass a backcheck parts rod 80 to an underlying pocket 248 formed in the drum 246, operation of the slide plate 150a delivering the parts rod to the slot 244 initially. The drum 246 is mounted on a shaft 250 for rotation in the direction indicated in FIG. 10 by an arrow 252; and a conventional incremental drive, not shown, is provided for stepping the drum 246 in an angular manner.

In use of the apparatus 116a, the drum 246 is normally stationed in repose with a peripheral pocket 248 aligned beneath the slot 244 in base plate 148a. When a parts rod 80 is delivered to the slot 244 by the action of side plate 150a, the parts rod drops through the slot and into the pocket 248 where it is located in alignment wtih a parts body 76 of the articulated workpiece 114a. When the parts rod is so situated, the jack 242 is actuated to reciprocate the driver element 218 into endwise engagement with the parts rod so that the continuous rotation imparted to the driver element from the motor 230 may cause the parts rod to be turned into the pilot bore formed in the parts body, jack 242 acting thereafter to retract the driver element. As will be seen in FIG. 9, the drum 246 is fashioned with an undercut region 254 in confronting relationship with the driver element 218 for allowing the driver element to converge upon the table 118a and the parts body 76 positioned thereon for advancing the parts rod into the parts body.

After the parts rod has been assembled to a parts body in the workpiece 114a, the jack 190a is actauted to drive the cutter blade 180a into incising engagement with the strip 110a of the workpiece whereby to separate a completed parts assembly 38 from the workpiece as is indicated in FIG. 11. The drum 246 is then rotated through a small angle after the cutter blade has been withdrawn, thus allowing the workpiece 114a to be advanced by the drive arrangement 120a. As the drum 246 continues to be rotated in an angularly incremental manner upon the repeated assembly of parts rods to the parts bodies in the workpiece, the completed backcheck assemblies 38 drop from the drum under the influence of gravity into a bin provided for receiving the same. In the apparatus 116a, motion of the workpiece 114a along its path of movement may be arrested by a solenoid-actuated stop foot selectively lowered into contact with the workpiece at an appropriate location or by the physical presence of completed parts assemblies remaining in connected relationship with the drum 246 by virtue of the parts rods 80 residing in the pockets 248. Other stop means may also be provided if desired.

An elongated backup member 256 is mounted on the table 118a confronting the workpiece 114a on the opposite side thereof from the rod assembly arrangement 138a, as is well shown in FIG. 9. The backup member 256 is provided with a contoured surface 258 which matably receives the confronting, contoured surface of the backcheck parts bodies 76, backup member 256 providing a guiding as well as a backing function.

Turning to FIGS. 12–16 and with reference first to FIG. 12, a number of the catcher parts bodies 82 are seen to be laterally aligned and partially coated with a quantity of adhesive material 112b in preparation for receipt of a strip 110b of flexible resilient material. After the strip 110b has been affixed to the several parts bodies 82, the resultant assembly defines an articulated workpiece 114b. Each of the catcher parts bodies 82 is fashioned with a cylindrical hole or bore 260 which is sized for receipt of the catcher rod or shank 86, as is indicated in FIG. 16. Advantageously, a layer 262 of a suitable adhesive acts between the walls of hole 260 and the confronting surfaces of shank 86 for purposes of permanently securing the shank to the catcher body.

Because the shank 86 is assembled to the parts body 82 in generally right-angled relationship, the apparatus 116b which is illustrated in FIGS. 13–15 employs a substantially modified rod assembly arrangement 138b. Specifically, the rod assembly arrangement 138b includes a double chambered housing 264 which is situated beneath the table 118b. The walls of housing 264 define an upper chamber 266 which opens upwardly toward the table 118b and which opens laterally in the direction which the workpiece 114b takes over the table. Considering FIG. 15, the chamber 266 is provided with an endwall 268 which defines a positioning surface for a parts rod 86, endwall 268 being vertically aligned interjacent a hole 270 formed in the table 118b and an aperture 272 opening through the floor of chamber 266. The hole 270 is sized and positioned to pass a catcher parts rod 86 into the pilot hole 260 formed in a part body 82; and the aperture 272 is sized and positioned to admit a driver element 274, the driver element 274 comprising the extensible and retractable piston rod of a fluid-actuated jack 276.

The walls of housing 264 also define a lower chamber 278 which is adapted to receive a quantity of the parts rods 86 in vertically disposed, parallel alignment. The chamber 278 includes an endwall 280 against which the parts rods 86 are urged by means of a fluid-actuated jack 282. For this purpose, the jack 282 has an extensible and retractable piston rod 284 to the end of which there is attached a pressure foot 286. A horizontal plate 288 defines both the roof of chamber 278 and the floor of chamber 266, and the plate 288 is perforated with an aperture 290 which is vertically aligned with the endwall 280. A fluid-actuated jack 292 is mounted beneath chamber 278 and includes an extensible and retractable piston rod 294 which operates through a suitably shaped aperture in the floor of chamber 278 to drive the parts rods 86 one at a time from the chamber 278 upwardly and into the chamber 266. A fluid-actuated jack 296 is mounted in the chamber 266 with a pressure foot 298 secured to its extensible and retractable piston rod 300. Thus, the jack 282 serves to keep the grouped parts rods 86 urged against the endwall 280 while jack 292 serves to deliver these rods individually into the chamber 266 where they are caught by the pressure foot 298 and urged against the endwall 268. In such latter position, a parts rod 86 may be driven into an awaiting parts body 82.

It is advantageous to apply a web of active adhesive material to the upper end portion of a parts rod 86 immediately prior to its being driven into an awaiting parts body. Therefore, one or more dispensing nozzles 302 are situated between the housing 264 and the table 118b radially outwardly from the parts rod passageway defined between aperture 272 and the hole 270. The nozzles 302 are supplied with a suitable adhesive material under pressure from a reservoir, not shown.

The apparatus 116b of FIGS. 13–15 is also distinguished by the orientation of the cutter arrangement 140b, the cutter blade 180b of the cutter arrangement being specifically oriented for vertical or guillotine operation. In addition, a pressure foot unit 304 is mounted on the cutter blade 180b to aid in positioning the workpiece 114b for the severing action of the cutter blade. With specific reference to FIGS. 14 and 15, the unit 304 is seen to include a pressure foot 306 which is attached to the bottom edge of a vertical slide plate 308. The slide plate 308 is mounted for vertical oscillation by means of studs 310 which pass slidably through vertical slots 312 fashioned in the plate 308, studs 310 being threadedly received in the material of cutter blade 180b or bolted or riveted thereto as is desired. A block 314 is mounted on the face of plate 308, and block 314 is fashioned with an upwardly opening recess which acts to receive and retain one end of a compression spring 316. The opposite end of spring 316 is received and retained in a recess formed in an upper block 318 that is secured to the cutter blade 180b.

In use of the apparatus 116b, the pressure foot 306 engages the workpiece 114b in advance of the cutting edge of blade 180b when the fluid-actuated jack 190b is directed to lower the cutter blade. After the pressure foot 306 has engaged the workpiece, continued lowering of the cutter blade eventually drives the edge of the blade into incising relationship with the strip 110b, severing the same and separating a completed parts assembly 40 from the workpiece. Upon raising of the cutter blade 180b, the pressure foot 306 remains in positioning contact with the workpiece 114b until after the lower edge of the cutter blade has cleared the workpiece, compression spring 316 accommodating this action of the pressure foot 306.

It will be observed that the stop member 196b engages the workpiece 114b at the toe-like section of the parts bodies 82 in clearing relationship with respect to the line of advance of the parts rods 86. Thus, the stop member 196b may be operated by the solenoid 200b so as to release the workpiece 114b to the advancing action of drive arrangement 120b for ejecting a finished parts assembly 40 from the discharge end of table 118b and into an awaiting bin.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. The method of making damper lever assemblies and like parts for a piano action mechanism which method comprises the steps of: securing an elongated strip of flexible resilient material to a plurality of aligned parts bodies whereby to interconnect said parts bodies forming an articulated workpiece; supporting said workpiece for longitudinal movement; engaging said workpiece at the parts bodies thereof with an impositive drive for continuously urging said workpiece along a predetermined path; selectively stopping said workpiece in said path; assembling a rod member to one of said parts bodies adjacent the leading end of said workpiece; severing said strip interjacent two leading parts bodies to separate a parts body from said workpiece; and releasing said workpiece to the action of said impositive drive momentarily to advance said workpiece.

2. The method of making damper lever assemblies and like parts for a piano action mechanism which method comprises the steps of: securing an elongated strip to a plurality of aligned parts bodies whereby to interconnect said parts bodies forming a workpiece; engaging said workpiece with an impositive drive for continuously urging said workpiece along a predetermined path; selectively stopping said workpiece; performing a work operation on one of said parts bodies adjacent the leading end of said workpiece while said workpiece is selectively stopped; severing said strip between adjacent parts bodies at the leading end of said workpiece in continuation of the stopped condition of said workpiece for separating a parts assembly from said workpiece; and releasing said workpiece to the action of said impositive drive momentarily to advance said workpiece.

3. The method according to claim 2 wherein said work operation comprises assembling a rod member to one of said bodies.

4. The method according to claim 2 wherein said advancing workpiece acts to eject the separated parts assemblies from said path.

5. The method according to claim 2 wherein said impositive drive engages said workpiece at said parts bodies and away from said elongated strip.

6. The method according to claim 2 wherein said parts bodies are preliminarily aligned in laterally closely adjacent relationship.

References Cited by the Examiner
UNITED STATES PATENTS

| | | | |
|---|---|---|---|
| 2,361,139 | 10/1944 | White et al. | 29—150 |
| 2,666,253 | 1/1954 | Morberg | 29—155.55 |
| 3,174,210 | 3/1965 | Margulus | 29—417 X |

JOHN F. CAMPBELL, *Primary Examiner.*

THOMAS H. EAGER, *Examiner.*